United States Patent
Ikeda

(10) Patent No.: US 10,568,157 B2
(45) Date of Patent: Feb. 18, 2020

(54) COMMUNICATION APPARATUS THAT CARRIES OUT COMMUNICATIONS WITH EXTERNAL APPARATUSES, CONTROL METHOD THEREFOR, AND STORAGE MEDIUM

(71) Applicant: CANON KABUSHIKI KAISHA, Tokyo (JP)

(72) Inventor: Kouji Ikeda, Inagi (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 5 days.

(21) Appl. No.: 16/055,804

(22) Filed: Aug. 6, 2018

(65) Prior Publication Data

US 2019/0053304 A1    Feb. 14, 2019

(30) Foreign Application Priority Data

Aug. 9, 2017    (JP) .................. 2017-154099

(51) Int. Cl.
| | |
|---|---|
| *H04L 12/50* | (2006.01) |
| *H04W 76/14* | (2018.01) |
| *H04L 5/00* | (2006.01) |
| *H04W 76/15* | (2018.01) |
| *H04W 76/34* | (2018.01) |
| *H04W 8/00* | (2009.01) |

(Continued)

(52) U.S. Cl.
CPC ............. *H04W 76/14* (2018.02); *G06F 8/65* (2013.01); *H04L 5/005* (2013.01); *H04L 41/0803* (2013.01); *H04N 5/23206* (2013.01); *H04W 8/005* (2013.01); *H04W 52/0251* (2013.01); *H04W 52/0274* (2013.01); *H04W 76/15* (2018.02); *H04W 76/34* (2018.02); *H04L 69/40* (2013.01); *H04W 4/80* (2018.02)

(58) Field of Classification Search
CPC ....................................................... H04L 12/50
USPC ........................................................ 370/329
See application file for complete search history.

(56) References Cited

U.S. PATENT DOCUMENTS

2014/0143679 A1*  5/2014  Lahr .................. G06K 9/00711
                                                          715/748

FOREIGN PATENT DOCUMENTS

| JP | 2014-211665 A | 11/2014 |
|---|---|---|
| JP | 2016-025374 A | 2/2016 |

* cited by examiner

*Primary Examiner* — Dang T Ton
(74) *Attorney, Agent, or Firm* — Cowan, Liebowitz & Latman, P.C.

(57) ABSTRACT

A communication apparatus which is capable of, for a peripheral device of which connection destination is limited to an image pickup apparatus, appropriately changing data without requiring complicated user operations. Wireless communications with a determined one of a first external apparatus and a second external apparatus are carried out using a predetermined protocol. The second external apparatus connects to the first external apparatus by transmitting an advertisement based on the predetermined protocol to the first external apparatus. In a case where an instruction to establish a connection with the first external apparatus is received, a connection with the second external apparatus is established, and then an instruction to stop the transmission of the advertisement is transmitted to the second external apparatus. After that, the connection with the second external apparatus is terminated, and transmission of another advertisement based on the predetermined protocol is started.

17 Claims, 8 Drawing Sheets

(51) Int. Cl.
  *H04N 5/232* (2006.01)
  *G06F 8/65* (2018.01)
  *H04W 52/02* (2009.01)
  *H04L 12/24* (2006.01)
  *H04W 4/80* (2018.01)
  *H04L 29/14* (2006.01)

COMMUNICATION APPARATUS THAT CARRIES OUT COMMUNICATIONS WITH EXTERNAL APPARATUSES, CONTROL METHOD THEREFOR, AND STORAGE MEDIUM

BACKGROUND OF THE INVENTION

Field of the Invention

The present invention relates to a communication apparatus, a control method therefor, and a storage medium.

Description of the Related Art

Conventionally, peripheral devices for a camera such as camera accessories are based on the premise that they are used in a state of being connected to the camera, and therefore, to configure settings on the peripheral devices and update firmware thereof, the peripheral devices are usually connected to the camera, which in turn sends data to the peripheral devices.

As wireless communication apparatuses, wireless communication systems are known which are remotely operated with a remote controller or the like using various wireless communication standards such as Wi-Fi (registered trademark), Zigbee (registered trademark), and Bluetooth (registered trademark). In recent years, cameras equipped with wireless communication functions have also appeared on the market, and a technique for controlling the cameras from a connection destination by wirelessly connecting to a remote controller or smartphone has started to become widespread. In particular, cameras which stay connected to a smartphone using Bluetooth Low Energy (hereafter referred to as BLE) because of its low power consumption also appeared on the market. There is also known a technique of using wireless functions not only to control a camera with a remote controller but also to update firmware of and change settings on the remote controller from the camera.

Japanese Laid-Open Patent Publication (Kokai) No. 2014-211665 discloses a technique of, when a lens which is an accessory and a camera are connected together, updating firmware (program) of the lens if a new version of firmware for the lens is present in the camera. Japanese Laid-Open Patent Publication (Kokai) No. 2016-025374 discloses a technique of, when a camera sends a search request for wireless communication, setting a device name of a smartphone that has already been paired with the camera, not a device name of the camera which is sender information.

However, to make data changes, for example, update firmware of and change settings on peripheral devices for an image pickup apparatus by using a camera, it is necessary to prepare data for data changes, and hence there is a problem that, for example, operations performed on the camera by a user become complicated. Moreover, the peripheral devices have limited user interfaces, for example, have no display unit. Therefore, when data is to be changed by operating the peripheral devices, there is a problem that operations performed n the camera by a user become complicated. Further, in many cases, destinations of wireless communications by the peripheral devices are limited to an image pickup apparatus in view of security and convenience.

SUMMARY OF THE INVENTION

The present invention provides a communication apparatus that is capable of, for a peripheral device of which connection destination is limited to an image pickup apparatus, appropriately changing data without requiring complicated user operations, a control method therefor, and a storage medium.

Accordingly, the present invention provides a communication apparatus comprising a receiving unit configured to receive an instruction, a communication unit configured to carry out wireless communications with a determined one of a first external apparatus and a second external apparatus by using a predetermined protocol, and a control unit configured to control the communication unit, wherein the second external apparatus connects to the first external apparatus by transmitting an advertisement based on the predetermined protocol to the first external apparatus, and in a case where the receiving unit receives an instruction to establish a connection with the first external apparatus, the control unit connects to the second external apparatus and then sends an instruction to stop the transmission of the advertisement to the second external apparatus, and after that, causes the communication unit to carry out a first connection process in which the connection with the second external apparatus is terminated, and a second connection process in which transmission of another advertisement based on the predetermined protocol is started.

According to the present invention, for a peripheral device of which connection destination is limited to an image pickup apparatus, data is appropriately changed without requiring complicated user operations.

Further features of the present invention will become apparent from the following description of exemplary embodiments (with reference to the attached drawings).

DESCRIPTION OF THE EMBODIMENTS

Embodiments of the present invention will now be described with reference to the drawings.

Figure 1:
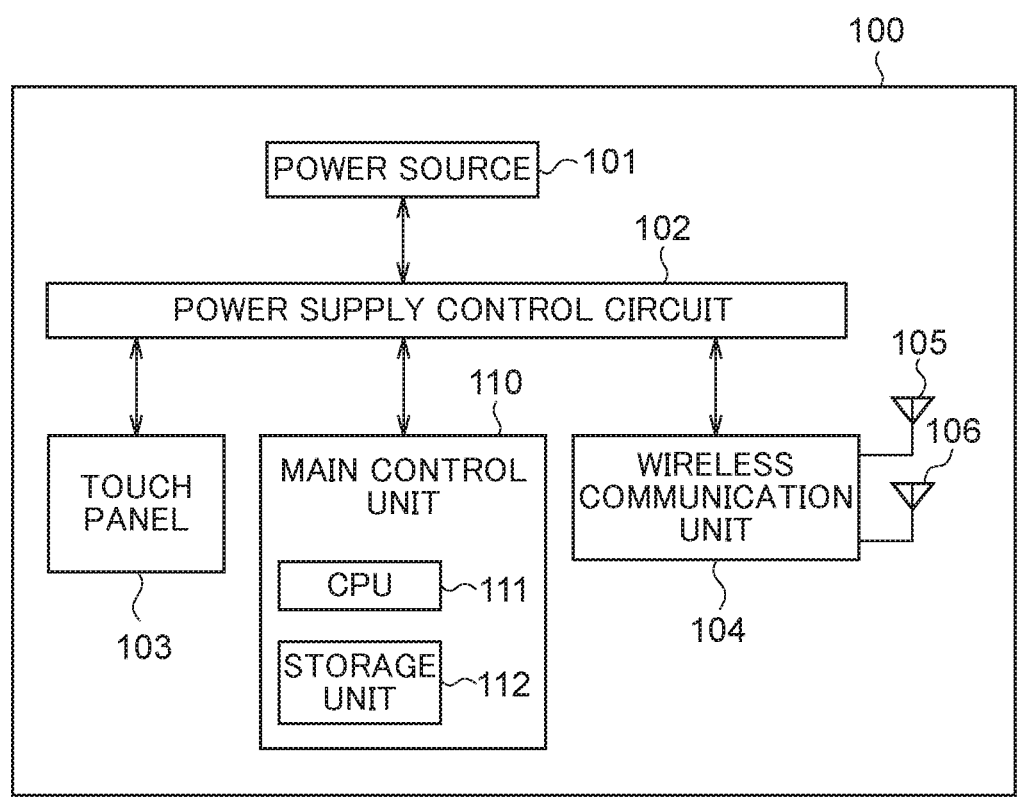
FIG. 1 is a diagram showing an arrangement of a smartphone.

First, a description will be given of a first embodiment of the present invention. A communication system according to the first embodiment has a camera 200 which is an example of an image pickup apparatus, a remote controller 300 which is a peripheral device for the image pickup apparatus, and a smartphone 100 which is an example of a communication apparatus capable of wirelessly connecting to the image pickup apparatus. FIG. 1 is a diagram showing an arrangement of the smartphone 100. The smartphone 100 is capable of connecting to a server apparatus and others on the Internet. In the smartphone 100, power is supplied from a battery 101 to a touch panel 103, a main control unit 110, and a wireless communication unit 104 through a power supply control circuit 102. Here, the touch panel 103 is configured as an integral unit comprised of an input device and a display device. An antenna 105 for carrying out Bluetooth Low Energy (BLE) communications and Wi-Fi communications and an antenna 106 for connecting to a public line are connected to the wireless communication unit 104. In the present embodiment, the smartphone 100 carries out BLE communications with the camera 200 and the remote controller 300, to be described later, via the wireless communication unit 104.

The main control unit 110 has a CPU 111 and a storage unit 112. The CPU 111 carries out various types of processes by reading out control programs stored in the storage unit 112. The storage unit 112 stores various types of data and various types of programs. It should be noted that processes by the smartphone 100, to be described later, are implemented by the CPU 111 reading out programs stored in the storage unit 112 and executing them. Examples of the storage unit 112 include storage media such as a ROM and an SD card. The CPU 111 carries out, for example, a process for determining a connection destination of a wireless communication. The storage unit 112 stores encryption keys for authenticating connection destinations when paring with them. Based on the encryption keys, the CPU 111 determines whether or not to carry out a wireless communication according to whether or not a connection destination is an already-paired one.

It should be noted that in another example, functions and processes performed by the smartphone 100 may be implemented at least partially by a plurality of CPUs and storage units collaborating with one another. In still another example, functions and processes performed by the smartphone 100 may be implemented at least partially by a hardware circuit. For example, the wireless communication unit 104 may have a determination circuit which carries out the above described process for determining a connection destination of a wireless communication.

Figure 2:
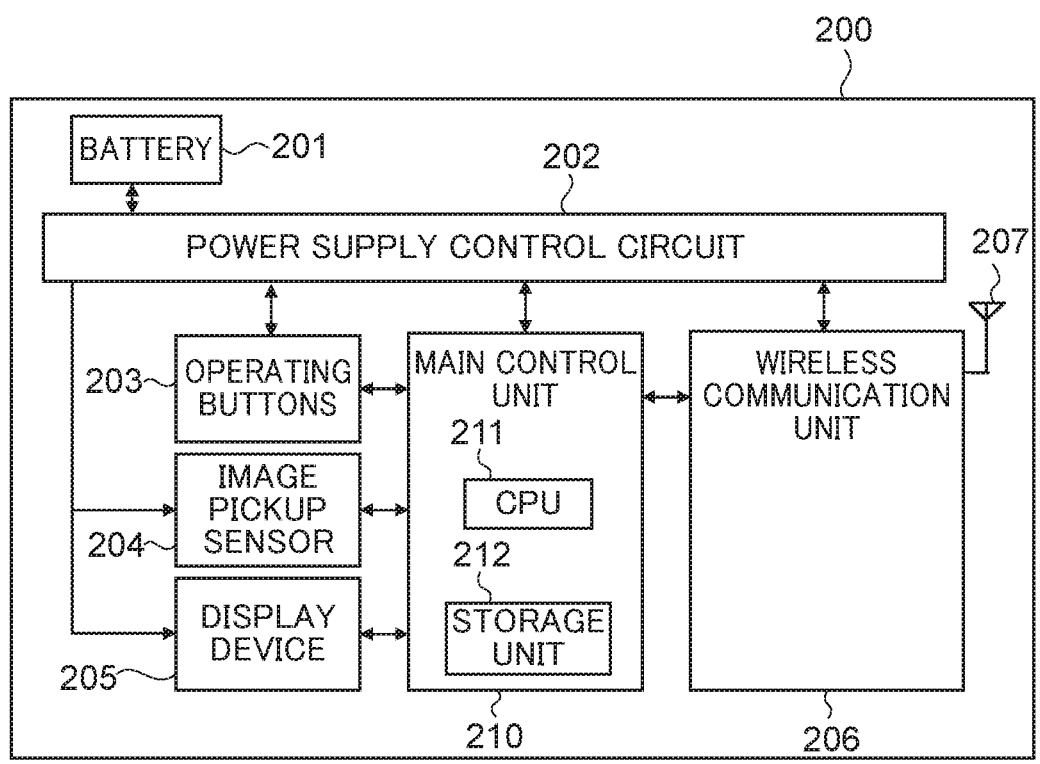
FIG. 2 is a diagram showing an arrangement of a camera which is a communication apparatus according to a first embodiment.

FIG. 2 is a diagram showing an arrangement of the camera 200. In the camera 200, power is supplied from a battery 201 to each block in the camera 200 through a power supply control circuit 202. The camera 200 is equipped with a number of operating buttons such as a release button, an AF button, and a menu button and a select button for configuring settings on a camera main body as operating buttons 203.

A main control unit 210 has a CPU 211 and a storage unit 212. The CPU 211 and the storage unit 212 are the same as the CPU 111 and the storage unit 112, respectively, shown in FIG. 1. Processes performed by the camera 200, to be described later, are implemented by the CPU 211 reading out programs stored in the storage unit 212 and executing them. Further, in the camera 200, an image pickup sensor 204 and a display device 205 are connected to the main control unit 210. The main control unit 210 controls operations such as shutter release, AF, and displaying of images according to buttons pressed among the operating buttons 203. A wireless communication unit 206 is also connected to the main control unit 210. The main control unit 210 receives signals, which are received by an antenna 207, through the wireless communication unit 206. The main control unit 210 sends instructions to transmit radio by way of the wireless communication unit 206. The camera 200 carries out BLE communications through the wireless communication unit 206.

Figure 3:
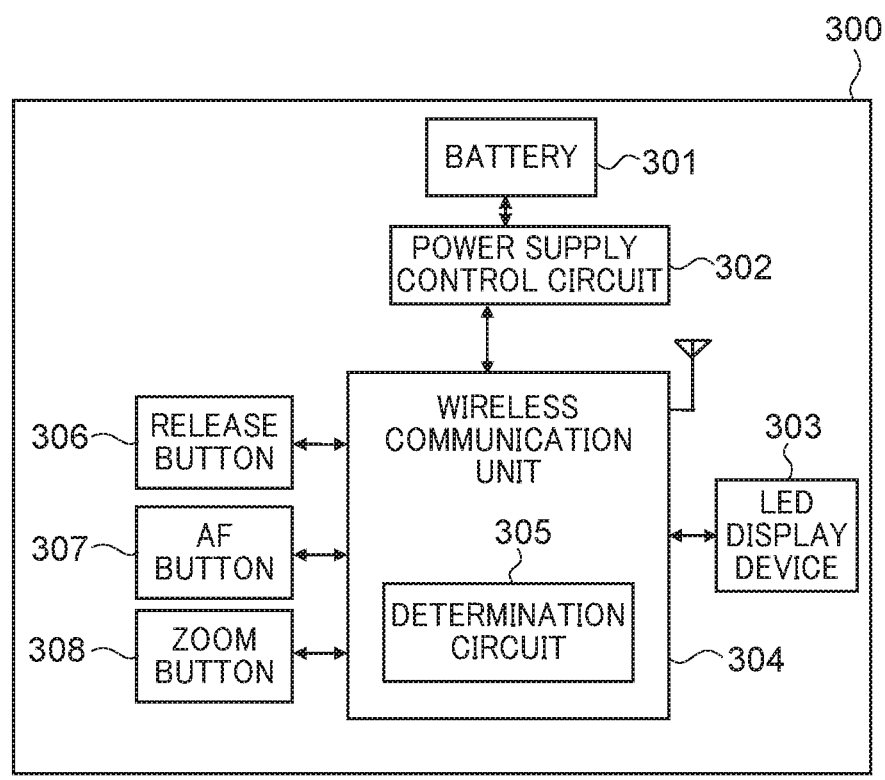
FIG. 3 is a diagram showing an arrangement of a remote controller.

FIG. 3 is a diagram showing an arrangement of the remote controller 300. The remote controller 300 is a device for remotely operating the camera 200. In the remote controller 300, power is supplied from a battery 301 to a wireless communication unit 304 through a power supply control circuit 302. Power is also supplied to an LED display device 303 and various buttons from the power supply control circuit 302 or through the wireless communication unit 304. A release button 306, an AF button 307, a zoom button 308, and an LED display device 303 are connected to the wireless communication unit 304. The wireless communication unit 304 wirelessly transmits information indicating which button was pressed. The wireless communication unit 304 also has a determination circuit 305. The determination circuit 305 stores encryption keys for authenticating connection destinations when pairing with them and determines whether or not to permit wireless connection. The remote controller 300 carries out BLE communications via the wireless communication unit 304.

Figure 4A:
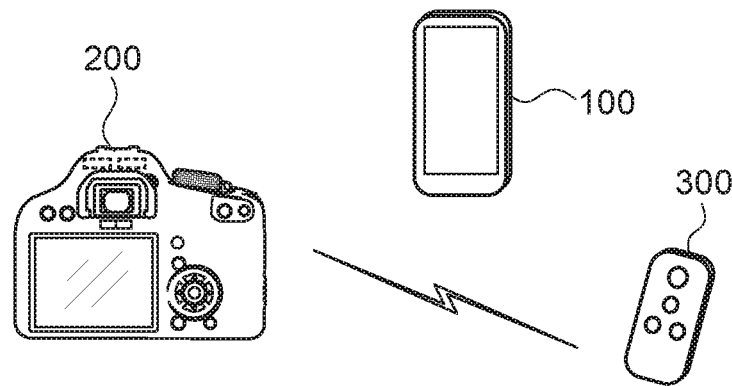
FIGS. 4A, 4B, and 4C are views useful in explaining connection states of the smartphone, the camera, and the remote controller in wireless communications.
Figure 4B:
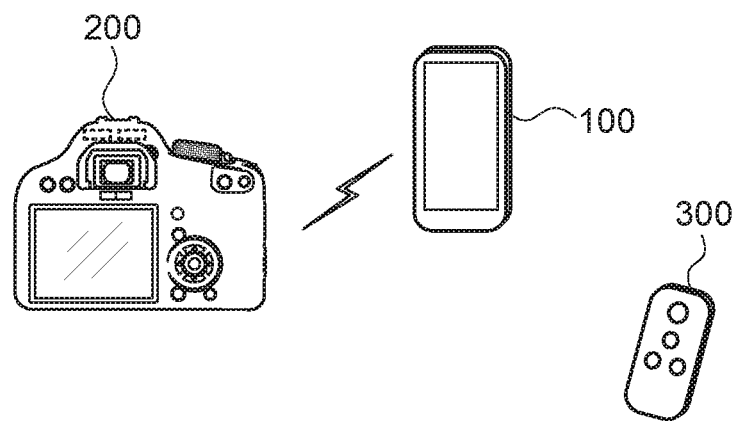
Figure 4C:
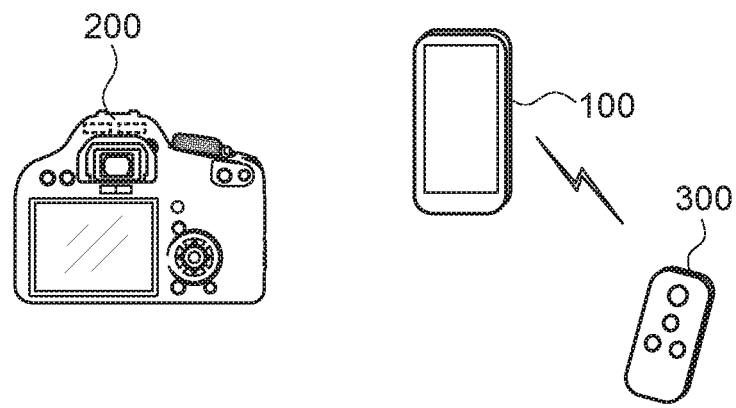

The FIGS. 4A to 4C are views useful in explaining connection states of the smartphone 100, the camera 200, and the remote controller 300 in wireless communications. The smartphone 100, the camera 200, and the remote controller 300 are wirelessly connected to one another. Examples of wireless communication modes include Bluetooth, Bluetooth Low energy (hereafter referred to as BLE), Zigbee, and Wi-Fi. As compared to infrared communication modes, the wireless communication modes have advantages that two-way communication is possible, directivity is low, places of operation are not limited, and communication distances are relatively long. Particularly among those wireless communication modes, the BLE mode consumes a relatively small amount of power and has a capability to withstand usage for a remote controller or the like operating on a coin-type battery.

On the other hand, for example, in a BLE network, a star network topology of a one-to-many connection type is adopted, and communication partners are limited to a central which is a center of the network and a peripheral which is a connection destination. A device such as a smartphone expected to be used for communication with a variety of connection destinations can be either a central or a peripheral. On the other hand, a device such as a camera or a camera accessory of which connection destinations are limited to some extent is usually limited to a central or a peripheral so as to simplify operations.

In the communication system according to the present embodiment, the smartphone 100 is able to act as either a central or a peripheral. The camera 200 acts as a central, and the remote controller 300 acts as a peripheral.

FIG. 4A is a view showing a first connection state. The first connection state means a state in which a wireless connection is established between the camera 200 and the remote controller 300. In the first connection state, the smartphone 100 is connected to neither the camera 200 nor the remote controller 300. In the first connection state, a user is performing shooting with the camera 200 by operating the remote controller 300, or the camera 200 is ready to be used for shooting. To operate the remote controller 300, it is necessary to wirelessly connect the remote controller 300 to the camera 200. FIG. 4B is a view showing a second connection state. The second connection state means a state in which a wireless connection is established between the smartphone 100 and the camera 200. In the second connection state, no wireless connection is established between the remote controller 300 and the smartphone 100 and between the remote controller 300 and the camera 200. FIG. 4C is a view showing a third connection state. The third connection state means a state in which a wireless connection is established between the smartphone 100 and the remote controller 300. In the third connection state, no wireless connection is established between the camera 200 and the smartphone 100 and between the camera 200 and the remote controller 300.

The camera 200 is able to switch wireless connection destination according to wireless connection modes. The camera 200 can be placed in three wireless connection modes consisting of a normal mode, a remote control mode, and a smartphone mode. The normal mode is a mode in which connection destinations are not limited, and in this mode, the camera 200 is allowed to connect to either of the smartphone 100 or the remote controller 300.

In the remote control mode, the camera 200 is allowed to connect only to the remote controller 300. In the remote control mode, a wireless connection can be established between the camera 200 and the remote controller 300 as shown in FIG. 4A. In the smartphone mode, the camera 200 can connect only to the smartphone 100. In the smartphone mode, a wireless connection is established between the camera 200 and the smartphone 100 as shown in FIG. 4B. For example, when the user wants to take a shot with the camera 200 by operating the remote controller 300, he or she sets the wireless connection mode to the remote control mode in advance by operating the operating buttons 203 of the camera 200. When the user wants to view, on the smartphone 100, an image taken by the camera 200 and stored in the camera 200, he or she sets the wireless connection mode to the smartphone mode in advance by operating the operating buttons 203 of the camera 200.

A description will now be given of BLE connection between the camera 200 and the remote controller 300. The camera 200 and the remote controller 300 need to be paired in advance so that the camera 200 and the remote controller 300 can be ready to communicate with each other. The reason for this is that the camera 200 and the remote controller 300 need to register each other so as to recognize parties at the other end and prevent malfunctions even in an environment where there is a plurality of devices. Further, by setting the wireless connection mode of the camera 200 to the remote control mode, the camera 200 is ready to receive remote control operations.

To start pairing, the user configures settings to start a pairing operation from a menu screen of the camera 200. In response to the user operation, the camera 200 transmits information required for pairing. Further, in the remote controller 300, the user presses a pairing start button of the remote controller 300 so as to start pairing. As a result, the remote controller 300 is placed in a pairing mode. When the remote controller 300 is placed in the pairing mode, it receives a pairing request from the camera 200 and transmits information required for pairing to the camera 200.

In paring, devices exchange their device addresses unique to them. One device can trust the other one that has the received device address, and hence they perform an authentication step of recording information indicating that no problem will arise if they connect to each other. After authenticating each other, the camera 200 and the remote controller 300 complete pairing by storing their mutual device addresses and encryption keys for use in the next connection in their respective storage units. It should be noted that at the time of pairing, only device addresses may be stored without storing encryption keys. The reason for this is that device addresses are unique to devices, and hence connection destinations are identified as long as the device addresses are grasped of.

Figure 5:
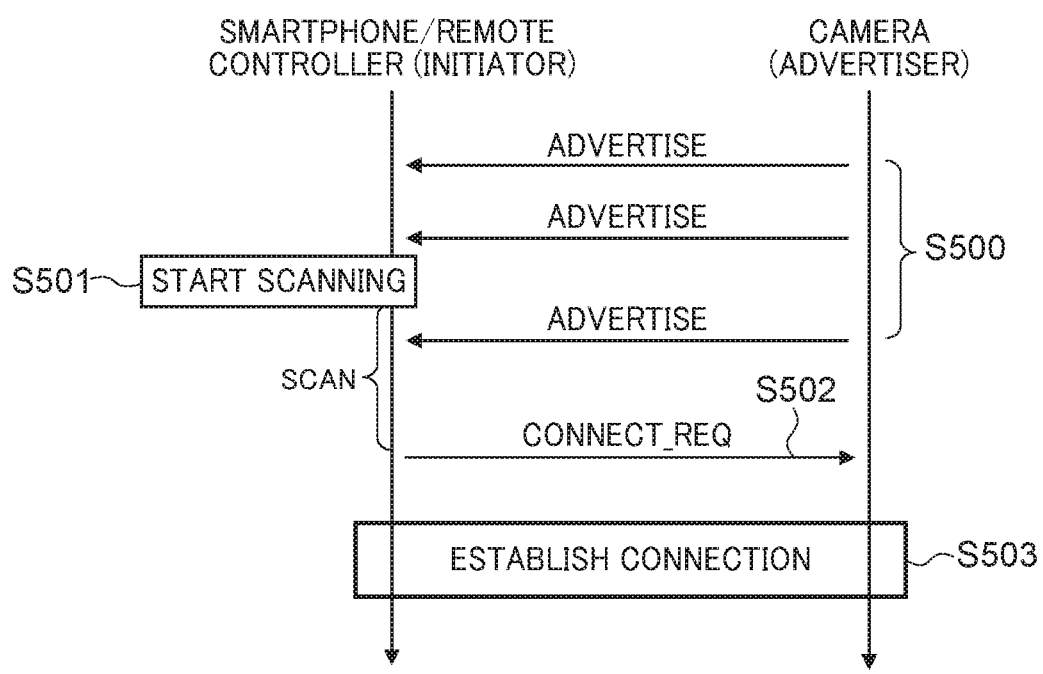
FIG. 5 is a sequence diagram showing a connection process.

FIG. 5 is a sequence diagram showing a connection process carried out between already-paired devices. To start connection using BLE, the user configures settings to start connection from the menu screen of the camera 200. As a result, in S500, the camera 200 (advertiser) starts to transmit an advertising packet. The camera 200 then continues transmitting the advertising packet at regular time intervals. On the other hand, in S501, triggered by a button operation by a user, the smartphone 100 or the remote controller 300 (initiator) starts scanning so as to start connection. The initiator receives the advertising packet from the camera 200 during the scanning period. The advertising packet includes a fixed access address, the device address of the camera 200, communication conditions, and so forth. Normal advertising packets can be received by any device. However, if communication conditions included in an advertising packet designate one device address of a connection destination obtained at the time of pairing, the party on the other end of communication for this advertising packet is limited.

The initiator that has received the advertising packet ascertains whether or not the advertising packet has been transmitted from an already-paired device. The initiator identifies a sender's device address in the advertising packet and determines whether or not it is a device address exchanged at the time of pairing. When the advertising packet is from an already-paired device, the initiator transmits a connection request (connect_REQ) as a response in S502. At this time, the advertiser is notified of a device address of the initiator and communication conditions at the time of connection (channel, timing, window size, etc.).

The advertiser that has received the connection request ascertains whether or not the connection request is from an already-paired device. The advertiser determines whether or not the device address of the initiator included in the connection request is a device address exchanged at the time of pairing. When the connection request is from an already-paired device, the advertiser holds information such as the device address of the initiator and the communication conditions and starts synchronizing and communicating with the initiator under the communication conditions included in the connection request in S503. On this occasion, the initiator and the advertiser act as a master and a slave, respectively, and establish a connection by shifting to a connection state called connection. The communication conditions also include information indicating whether or not to carry out an encrypted communication using the encryption keys exchanged at the time of pairing.

There may be cases where communication between the initiator and the other device is suspended due to interruption of communication from the other device at synchronized intervals. After pairing, however, the initiator already has information on the other device, and hence as long as the initiator receives an advertising packet for reconnection, it can automatically reconnect to the other device without requiring user operation. The remote controller 300 enters a power saving mode in which communication is stopped when no user operation is performed, that is, immediately after the wireless communication is ended. When the remote controller 300 is started by operating it, the remote controller 300 reconnects to the other end of communication as soon as it receives an advertising packet.

Main functions of establishing BLE connection between the camera 200 and the remote controller 300 and carrying out communications using BLE include a function of updating firmware of the remote controller 300 from the camera 200 as well as a function of controlling operation of the camera 200 from the remote controller 300. The remote controller 300 has a simple construction with a limited interface to external devices and dispensed with wired connectors, and hence firmware of the remote controller 300 is wirelessly updated. However, updating the firmware has a risk that if the firmware is updated with incorrect data, functions of the remote controller 300 cannot be correctly used. Wireless communication data tends to be intercepted and spoofed as compared to wired connection, and from the standpoint of security, it is necessary to prevent firmware from being arbitrarily rewritten for preventing improper use.

In general, BLE wireless communications are highly convenient because automatic reconnection between devices is possible without user operation insofar as they have already been paired. On the other hand, it is also important to improve security against undesired wireless connection. Particularly in a case where a device is equipped with a function of updating firmware by radio, security cannot be ignored because it is necessary to prevent incorporation of invalid functions without permission. Accordingly, important communications such as firmware update must be carried out only with trusted wireless connection destinations. For these reasons, in the present embodiment, the remote controller 300 which is configured to carry out one-to-one wireless communications only with the camera 200 which is a connection destination (the other end of communication).

There is another reason why the camera 200 sends advertising signals of which connection destination is limited when connecting to the remote controller 300. When there is another device nearby supporting BLE, it may request connection as a response to an advertisement of which connection destination is not limited. The camera 200 is not paired with this device and hence never establishes connection with it, but it is feared that responsivity will deteriorate due to increased unnecessary processes. This can be prevented by the camera 200 sending an advertising signal of which connection destination is limited.

The reason why connection destinations are limited will now be further described. To minimize power consumption, the remote controller 300 stops wireless connection when not operated so as to reduce power consumption. When the remote controller 300 is operated, a wireless communication device inside the remote controller 300 is started to communicate a desired operating command to the camera 200. For example, information indicating that the release button 306 of the remote controller 300 has been depressed is wirelessly transmitted to the camera 200 using BLE. Upon receiving this information, the camera 200 starts a shutter release operation. The camera 200 may also transmit a notification that shutter release is successful to the remote controller 300.

For example, there is a demand for shortening the time period from a remote control operation to a shutter release action of the camera 200 (a shutter release time lag) to the extent possible. Causing the camera 200 and the remote controller 300 to continuously communicate with each other at short time intervals would minimize the shutter release time lag, but this is not realistic because a large amount of power is consumed. For this reason, establishing a wireless connection and carrying out a communication only when the remote controller 300 is operated is suitable for minimizing power consumption. In this operation with minimized power consumption, the time period required for authentication in establishing a wireless connection is shortened by limiting connection destinations. As a result, the shutter release time lag is shortened.

In the present embodiment, a party which the remote controller 300 wirelessly connects to and control is limited to one camera 200. Further, the camera 200 after pairing transmits an advertising signal of which connection destination is limited. An exclusive communication is established by transmitting an advertisement that cannot be received by devices other than a designated device. For this reason, upon receiving a response from the remote controller 300, the camera 200 is able to immediately operate because of simplified authentication of a wireless connection destination, resulting in the shutter release time lag being reduced. This applies not only to the remote controller 300 but also to shortening of a time lag in firing of a flash when the camera 200 communicates with, for example, an electronic flash which is a camera accessory.

In the process shown in FIG. 5, since both the smartphone 100 and the remote controller 300 act as initiators, the smartphone 100 and the remote controller 300 cannot be wirelessly connected together. The smartphone 100, however, is able to act as either an initiator or an advertiser. Thus, in the present embodiment, the smartphone 100 and the remote controller 300 can be wirelessly connected together by the smartphone 100 acting as an advertiser while acting as an initiator.

Figure 6:
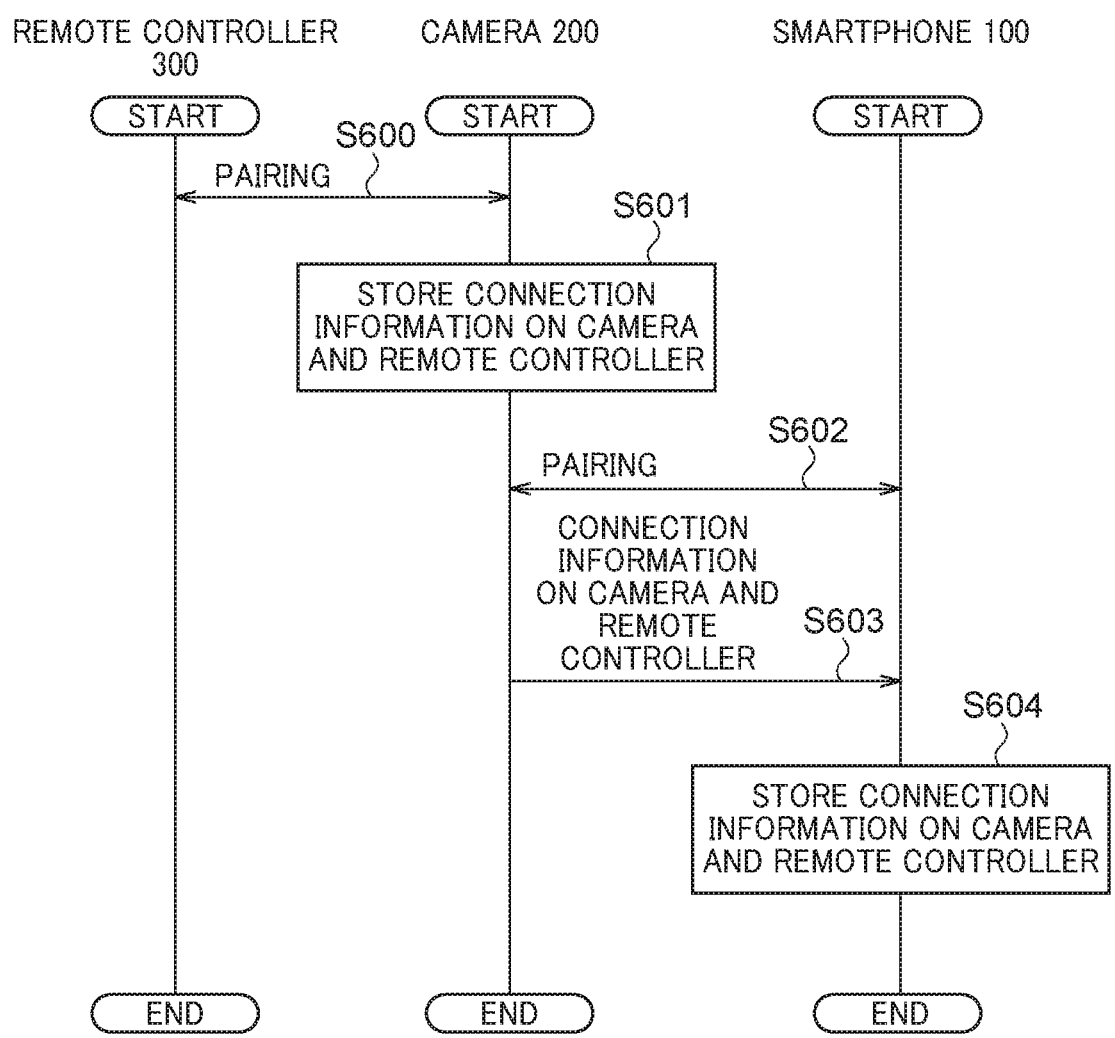
FIG. 6 is a sequence diagram showing a setting process.

FIG. 6 is a sequence diagram showing a setting process which is carried out by the communication system. The setting process is a preliminary preparation process for the smartphone 100 to access the remote controller 300. The setting process is based on the premise that the wireless connection mode of the camera 200 is set to the normal mode and transmits an advertising packet of which connection destination is not limited. In S600, the camera 200 receives an advertising packet, and the camera 200 and the remote controller 300 are paired with each other using BLE. As a result, the camera 200 and the remote controller 300 are ready to communicate with each other. Namely, they are brought into the first connection state shown in FIG. 4A. It should be noted that at this time, the smartphone 100 is connected to neither the camera 200 nor the remote controller 300.

Next, in S601, the camera 200 stores connection information used for pairing in the storage unit 212. Here, the connection information means information for use in connecting to the party on the other end of communication and includes device addresses, encryption keys, and so forth of respective devices (here, the camera 200 and the remote controller 300). Then, in S602, the smartphone 100 receives the advertising packet transmitted from the camera 200, and the smartphone 100 and the camera 200 are paired with each other using BLE. As a result, the smartphone 100 and the camera 200 are ready to communicate with each other. Namely, they are brought into the second connection state shown in FIG. 4B.

After that, in S603, the camera 200 transmits the connection information stored in the storage unit 212 in S601 to the smartphone 100 via BLE communication. When the smartphone 100 receives the connection information in S603, the process proceeds to S604. In S604, the smartphone 100 stores the connection information in the storage unit 112.

In another example, the smartphone 100 may store not only the connection information but also device information on the remote controller 300 in the storage unit 112. Here, the device information includes a model number, a firmware version, etc. of the remote controller 300. A process for the smartphone 100 to store, in the storage unit 112, the device information on the remote controller 300 is not limited to this embodiment. In still another example, instead of the smartphone 100 receiving the device information from the remote controller 300 via BLE communication, the user may input the device information to the smartphone 100 by operating the smartphone 100.

After the setting process is completed, the user can switch the wireless connection modes according to usage conditions of the camera 200, and for example, the user switches to the remote control mode when he or she wants to use the remote controller 300 and switches to the smartphone mode when he or she wants connect to the smartphone 100.

Figure 7:
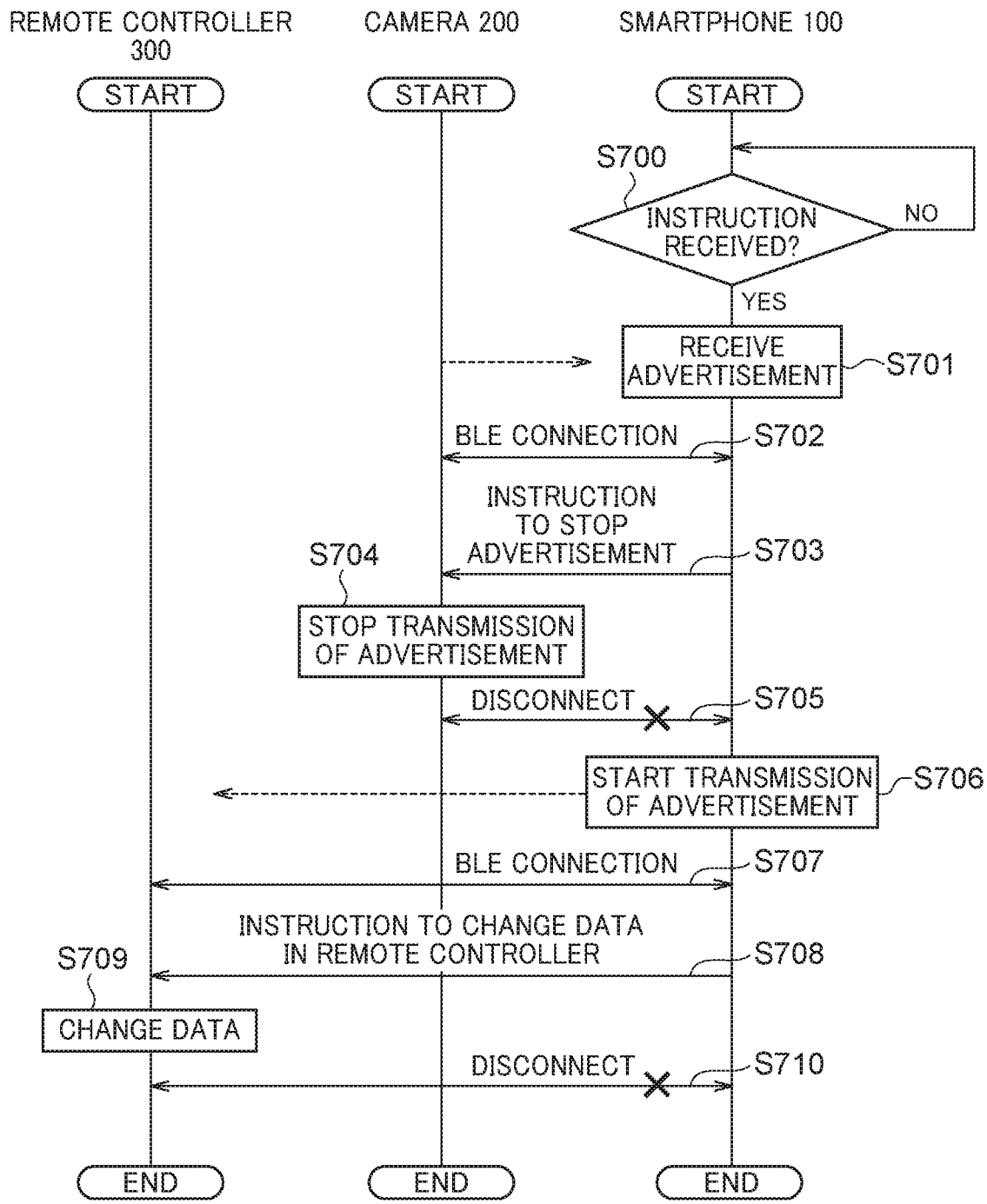
FIG. 7 is a flowchart showing a control process according to the first embodiment.

FIG. 7 is a flowchart showing a control process for the remote controller 300, which is carried out by the communication system. The control process is a process in which the smartphone 100 controls data changes in the remote controller 300. Here, data changes includes changes in settings on control parameters such as a change in an LED emission pattern of the remote controller 300 for providing notification and a change on (update of) firmware. The firmware is an example of setting information. The control process is based on the premise that the wireless connection mode of the camera 200 is set to the remote control mode. The reason for this is that a case where the user wants to change data in the remote controller 300 while operating the remote controller 300 is imagined. In the remote control mode, the camera 200 regularly transmits an advertising packet of which connection destination is limited to the remote controller 300.

When the user inputs an instruction for the remote controller 300 by operating the touch panel of the smartphone 100, the smartphone 100 accepts the instruction corresponding to the user operation in S700. When the smartphone 100 accepts the instruction, the process proceeds to S701. In S700, the smartphone 100 accepts an instruction to update firmware of the remote controller 300 as well as an instruction to change control parameters, for example, LED emission patterns of the remote controller 300. The smartphone 100 then starts a special-purpose application.

A description will now be given of firmware update. For example, files for the firmware of the remote controller 300 are stored in a server apparatus on the Internet. On the other hand, the smartphone 100 stores information on, for example, a version of the firmware of the remote controller 300 as the device information on the remote controller 300 in the storage unit 112. The smartphone 100 accesses the server apparatus by communication via a public line or Wi-Fi to ascertain whether or not the firmware of the remote controller 300 is up to date. When the firmware of the remote controller 300 is not up to date, the smartphone 100 downloads the latest firmware and notifies the user that there is the latest firmware. When the user receives this notification, he or she inputs an instruction to update the firmware. It should be noted that in another example, when the firmware is not up to date, the smartphone 100 may notify the user of this and proceed to S701 without waiting for an instruction from the user.

Next, in S701, the smartphone 100 receives an advertising packet transmitted from the camera 200. Then, in S702, the smartphone 100 transmits a connection request as a response to the advertising packet, causing the smartphone 100 and the camera 200 to establish a BLE connection. It should be noted that at the start of the control process, the smartphone 100 and the camera 200 has already been paired with each other in the setting process described above with reference to FIG. 6. As a result of the process in S702, they are brought into the state shown in FIG. 4B.

Under normal conditions, when the camera 200 is placed in the remote control mode, the camera 200 connects only to the remote controller 300 with which the camera 200 was configured to be paired. Even if there is the smartphone 100 nearby with which the camera 200 was configured to be paired, the camera 200 controls itself so as not to connect to the smartphone 100. However, the camera 200 is controlled by firmware such that even if the camera 200 is placed in the remote control mode, it is allowed to connect to the smartphone 100 only when updating the firmware of the remote controller 300. Specifically, in a case where a flag indicating that the firmware is to be updated is set in a response to the advertising packet, the camera 200 receives this response even if it was transmitted from the smartphone 100.

Then, in S703, the smartphone 100 transmits an advertisement stop instruction to the camera 200 via BLE communication. The advertisement stop instruction is information indicating an instruction to temporarily suspend the transmission of the advertising packet by the camera 200. Here, the advertisement stop instruction is an example of an instruction to prohibit wireless connection between the camera 200 and the remote controller 300. Upon receiving the advertisement stop instruction, the camera 200 stops the advertisement in S704. Then, in S705, the smartphone 100 terminates the BLE connection with the camera 200.

It should be noted that when the smartphone 100 and the camera 200 are in the connected state, the transmission of the advertising packet from the camera 200 is suspended, but after the BLE connection between the smartphone 100 and the camera 200 is terminated, the transmission of the advertising packet resumes. The advertisement stop instruction is an instruction for providing control to prevent the transmission of the advertising packet from resuming after the BLE connection between the smartphone 100 and the camera 200 is terminated. In accordance with the advertisement stop instruction, the camera 200 provides control to prevent the transmission of the advertising packet from resuming even after the BLE connection with the smartphone 100 is terminated.

After that, in S706, the smartphone 100 generates an advertising packet using the connection information on the camera 200 and the remote controller 300, which is stored in the storage unit 112. Specifically, the smartphone 100 generates the advertising packet including information indicating that the device address of the remote controller 300 is a connection destination and flag information indicating that the smartphone 100 is acting as a proxy for the camera 200 and communicating as a communication source with the remote controller 300. It should be noted that the connection information is stored beforehand in the storage unit 112 in the process in S604 described above with reference to FIG. 6. The smartphone 100 then starts to transmit the generated advertising packet. The smartphone 100 acts as an initiator in S701, but acts as an advertiser in S706.

In the present embodiment, the remote controller 300 is configured to be able to connect only to the camera 200. For this reason, in a case where the smartphone 100 transmits an advertising packet of which communication source is the smartphone 100, the remote controller 300 determines that authentication is impossible, and BLE connection cannot be established. On the other hand, the smartphone 100 acts as a proxy for the camera 200 to generate and transmit an advertising packet of which connection destination is limited to the remote controller 300. Therefore, in a case where the remote controller 300 has received the advertising packet, the remote controller 300 recognizes that the smartphone 100 is not eligible as a connection destination but is acting as a proxy for the camera 200 which is a connection destination. Further, the remote controller 300 determines that the smartphone 100 is a device allowed to connect to the remote controller 300 by the camera 200 and starts a process for establishing a wireless connection with the smartphone 100. At this time point, the transmission of the advertising packet from the smartphone 100 is stopped, and hence the transmission of the advertising packet from the smartphone 100 and the transmission of the advertising packet from the camera 200 are prevented from conflicting with each other.

When the user operates the remote controller 300 to shift it into a scanning state, the remote controller 300 is ready to receive an advertising packet from the smartphone 100. Then, in S707, the smartphone 100 provides control to establish a BLE connection with the remote controller 300. This brings them into the state shown in FIG. 4C. At this time, the transmission of the advertising packet from the camera 200 is stopped, and hence the remote controller 300 is prevented from connecting to the camera 200 before connecting to the smartphone 100. It should be noted that the process in S707 is an example of the communication control process.

Then, in S708, by using a special-purpose application, the smartphone 100 transmits an instruction to change data to the remote controller 300. Upon receiving the instruction to change data, the remote controller 300 changes data in accordance with the instruction to change data. For example, the remote controller 300 changes a setting on an LED emission pattern to non-emission. The remote controller 300 also updates the firmware when it has received an update instruction as well as new firmware for the remote controller 300 from the smartphone 100. When the changing of the data in the remote controller 300 has been completed, the special-purpose application of the smartphone 100 provides notification that the changing of the data has been completed. When the changing of the data has been completed, the smartphone 100 disconnects from the remote controller 300 in S710.

It should be noted that although the camera 200 has stopped transmitting the advertising packet, the camera 200 returns to the remote control mode when, for example, the camera 200 is operated for return from the power saving mode. This enables the camera 200 to smoothly resume using the remote controller 300.

In a case where light emitted by an LED for notification is reflected on a picked-up image by clothing or the like, this is coped with by weakening emission of the LED, changing emission timing of the LED, or making a setting that will terminate emission of the LED. It is difficult to make such a setting only with input buttons on the main body of the remote controller 300, but settings can easily be changed by way of the smartphone 100.

It should be noted that changing settings by way of the smartphone 100 is not limited to changing the LED emission pattern settings, but the control process may also be applied to a case described below. Namely, the control process may be applied to a case where the user performs shooting after freezing in a desired pose after depressing the release button of the remote controller 300 when taking a selfie using the remote controller 300, the time period from the depression of the release button to shutter release is adjusted (the setting is changed). In many cases, the remote controller 300 has no liquid crystal screen and has only a limited number of buttons, and therefore, is not suitable for input of numerals for setting time periods.

The smartphone 100 enables various inputs using the touch panel, and connecting the smartphone 100 and the remote controller 300 together makes it possible to easily change settings on the remote controller 300. For example, setting a device name of the remote controller 300 for wireless connection via the smartphone 100 enables the user who has a plurality of remote controllers 300 to easily determine which remote controller 300 is connected to the smartphone 100.

As described above, in the communication system according to the first embodiment, the smartphone 100 is able to wirelessly connect with the remote controller 300, which is configured to be connectable only to the camera 200, directly without involving the camera 200. As a result, data in the remote controller 300 can be directly changed from the smartphone 100, and therefore, the convenience of user operation is enhanced. Namely, in a peripheral device of which connection destination is limited to an image pickup apparatus, data is appropriately changed without requiring complicated user operation.

The process for stopping the transmission of the advertising packet from the camera 200 is not limited to the first embodiment described above. For example, in a first variation of the communication system according to the first embodiment, the transmission of the advertising packet from the camera 200 may be stopped by the user operating the camera 200 instead of carrying out the processes in S701 to S705 described above with reference to FIG. 7.

In a second variation of the communication system according to the first embodiment, the advertising packet from the camera 200 should not always be stopped. Although a conflict occurs in communication, there may be a case where connection is possible depending on wireless settings.

In a third variation of the communication system according to the first embodiment, after the BLE connection is established between the remote controller 300 and the smartphone 100 in S707 described above with reference to FIG. 7, the smartphone 100 may transmit arbitrary information (predetermined information). Namely, information to be transmitted is not limited to the instruction to change data.

Figure 8:
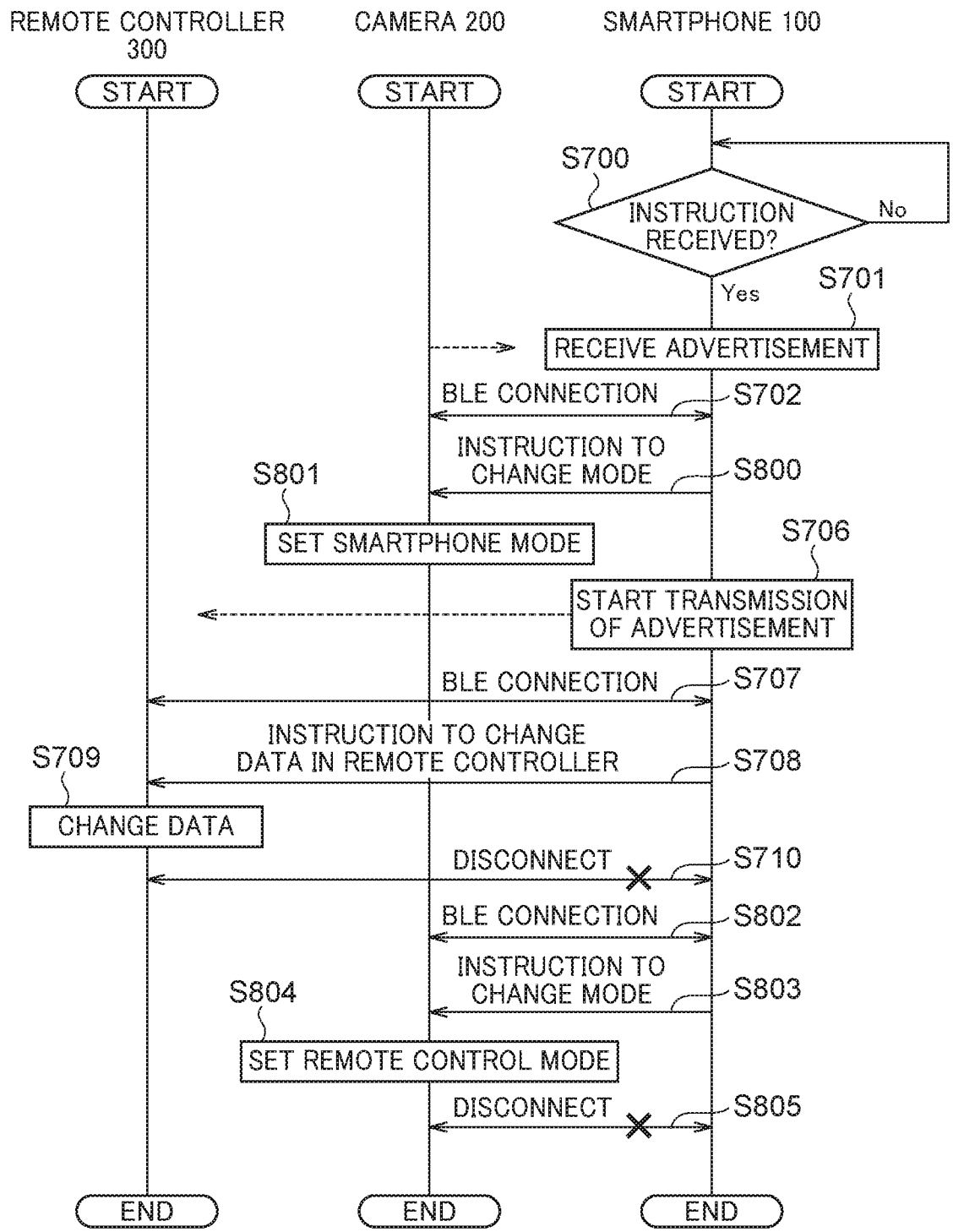
FIG. 8 is a flowchart showing a control process according to a second embodiment.

A description will now be given of a second embodiment of the present invention. In a communication system according to the second embodiment, after data in the camera 200 is changed under the control of the smartphone 100, the wireless connection between the camera 200 and the remote controller 300 is automatically resumed without requiring user operation. A description will now be given of features of the communication system according to the second embodiment which are different from those of the communication system according to the first embodiment. FIG. 8 is a flowchart showing a control process according to the second embodiment. Of steps in the control process in FIG. 8, the same steps as those in the control process according to the first embodiment are designated by the same reference numerals.

When the smartphone 100 establishes the BLE connection with the camera 200 in S702, the process proceeds to S800. In S800, the smartphone 100 transmits a mode changing instruction, which instructs the camera 200 to change its wireless connection mode to the smartphone mode, to the camera 200. Upon receiving the mode changing instruction, the camera 200 changes its wireless connection mode to the smartphone mode in S801 in accordance with the mode changing instruction. As a result, the camera 200 starts to transmit an advertising packet of which connection destination is limited to the smartphone 100. Namely, the advertising packet includes information that designates a device address of the smartphone 100 as a transmission destination. For the remote controller 300, this is equivalent to a case where no advertising packet is transmitted to itself. It should be noted that the advertising packet transmitted by the camera 200 has only to be one to which the remote controller 300 cannot respond, and its transmission destination should not always be limited to the smartphone 100.

After the process in S800, the smartphone 100 terminates the BLE connection between the smartphone 100 and the camera 200, and the process then proceeds to S706, in which the smartphone 100 starts transmitting the advertising packet. After the processes in S706 to S710, the smartphone 100 receives the advertising packet transmitted from the camera 200 and sends a response to establish the BLE connection with the camera 200 again in S802. Then, in S803, the smartphone 100 transmits a mode changing instruction, which instructs the camera 200 to change the wireless connection mode to the remote control mode, to the camera 200. Here, the mode changing instruction transmitted in S803 is an instruction to shift into a mode in which an advertising packet of which connection destination is limited to the remote controller 300 is transmitted, that is, an example of an instruction to resume wireless connection between the camera 200 and the remote controller 300.

Upon receiving the mode changing instruction, the camera 200 changes the wireless connection mode to the remote control mode in S804 in accordance with the mode changing instruction. As a result, the camera 200 is ready to transmit an advertising packet of which connection destination is limited to the remote controller 300. Namely, the advertising packet includes information that designates the device address of the remote controller 300 as a transmission destination. As a result, even after the BLE connection is temporary terminated, the smartphone 100 is placed in the remote control mode. A transmission destination setting that allows connection even to the remote controller 300 is easily made possible by the camera 200 seeing an address of a response to the advertising packet and then makes connection without transmission destinations being limited. After the process in S804, the BLE connection between the smartphone 100 and the camera 200 is terminated.

As described above, in the communication system according to the second embodiment, since the smartphone 100 controls the wireless connection modes of the camera 200, the wireless connection between the camera 200 and the remote controller 300 is automatically resumed after the data in the camera 200 is changed.

It should be noted that in the embodiments described above, the peripheral devices for the image pickup apparatus have only to be camera accessories equipped with wireless communication functions, and they are not limited to the remote controller. Other examples of the peripheral devices include an electronic flash, a wireless microphone, a wireless speaker, and a wireless monitor (EVF). The mode of wireless communication is not limited to BLE communication, but the present invention may be applied to other wireless communication modes in which connection is established in similar connection sequences.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2017-154099, filed Aug. 9, 2017, which is hereby incorporated by reference herein in its entirety.

What is claimed is:

1. A communication apparatus comprising:
a receiving unit configured to receive an instruction;
a communication unit configured to carry out wireless communications with a determined one of a first external apparatus and a second external apparatus by using a predetermined protocol; and
a control unit configured to control the communication unit,
wherein the second external apparatus connects to the first external apparatus by transmitting an advertisement based on the predetermined protocol to the first external apparatus, and
in a case where the receiving unit receives an instruction to establish a connection with the first external apparatus, the control unit connects to the second external apparatus and then sends an instruction to stop the transmission of the advertisement to the second external apparatus, and after that, causes the communication unit to carry out a first connection process in which the connection with the second external apparatus is terminated, and a second connection process in which transmission of another advertisement based on the predetermined protocol is started.

2. The communication apparatus according to claim 1, wherein in a case where the receiving unit receives the instruction to establish a connection with the first external apparatus, the control unit causes the communication unit to carry out the first connection process before connecting to the first external apparatus, and after that, causes the communication unit to carry out the second connection process.

3. The communication apparatus according to claim 1, wherein in a case where the receiving unit receives the instruction to establish a connection with the first external apparatus and send predetermine data to the first external apparatus, the control unit causes the communication unit to carry out the first connection process before connecting to the first external apparatus, and after that, causes the communication unit to carry out the second connection process.

4. The communication apparatus according to claim 1, wherein in a case where a predetermined time period has elapsed without a connection with the second external apparatus being established even after the control unit causes the communication unit to carry out the first connection process, the control unit causes the communication unit to carry out the second connection process.

5. The communication apparatus according to claim 1, wherein in a case where connection with the second external apparatus is to be attempted, the communication apparatus shifts into a mode in which an advertisement transmitted by the second external apparatus is received.

6. The communication apparatus according to claim 5, wherein in a case where the connection with the second external apparatus is to be attempted, the communication apparatus connects to the second external apparatus by sending a connection request to the second external apparatus in response to receipt of the advertisement transmitted by the second external apparatus.

7. The communication apparatus according to claim 1, further comprising another communication unit,
wherein the control unit controls the other communication unit to download firmware for the first external apparatus via the Internet.

8. The communication apparatus according to claim 6, wherein the connection request sent to the second external apparatus includes information on a process for updating firmware of the first external apparatus.

9. A control method for a communication apparatus, comprising:
a receiving step of receiving an instruction; and
a communication step of carrying out wireless communications with a determined one of a first external apparatus and a second external apparatus by using a predetermined protocol,
wherein the second external apparatus connects to the first external apparatus by transmitting an advertisement based on the predetermined protocol to the first external apparatus, and
in a case where an instruction to establish a connection with the first external apparatus is received in the receiving step, the communication step is executed in which a connection with the second external apparatus is established and then an instruction to stop the transmission of the advertisement is transmitted to the second external apparatus, and after that, a first connection process in which the connection with the second external apparatus is terminated, and a second connection process in which transmission of another advertisement based on the predetermined protocol is started are carried out.

10. The control method for the communication apparatus according to claim 9, wherein in a case where an instruction to establish a connection with the first external apparatus is received in the receiving step, the communication step is executed in which the first connection process is carried out before connection to the first external apparatus is established, and after that, the second connection process is carried out.

11. The control method for the communication apparatus according to claim 9, wherein in a case where the instruction to establish a connection with the first external apparatus and predetermine data is transmitted to the first external apparatus is received in the receiving step, the communication step is executed in which the first connection process is carried out before connection to the first external apparatus is established, and after that, the second connection process is carried out.

12. The control method for the communication apparatus according to claim 9, wherein in a case where a predetermined time period has elapsed without a connection with the second external apparatus being established even after the first connection process is carried out, the second connection process is carried out.

13. The control method for the communication apparatus according to claim 9, wherein in a case where connection with the second external apparatus is to be attempted, the communication apparatus shifts into a mode in which an advertisement transmitted by the second external apparatus is received.

14. The control method for the communication apparatus according to claim 13, wherein in a case where the connection with the second external apparatus is to be attempted, the communication apparatus connects to the second external apparatus by sending a connection request to the second external apparatus in response to receipt of the advertisement transmitted by the second external apparatus.

15. The control method for the communication apparatus according to claim 9, further comprising another communication step,
Wherein in the other communication step, firmware for the first external apparatus is downloaded via the Internet.

16. The control method for the communication apparatus according to claim 14, wherein the connection request sent to the second external apparatus includes information on a process for updating firmware of the first external apparatus.

17. A non-transitory computer-readable storage medium storing a program for causing a computer to execute a control method for a communication apparatus, the control method for the communication apparatus comprising:
a receiving step of receiving an instruction; and
a communication step of carrying out wireless communications with a determined one of a first external apparatus and a second external apparatus by using a predetermined protocol,
wherein the second external apparatus connects to the first external apparatus by transmitting an advertisement based on the predetermined protocol to the first external apparatus, and
in a case where an instruction to establish a connection with the first external apparatus is received in the receiving step, the communication step is executed in which a connection with the second external apparatus is established and then an instruction to stop the transmission of the advertisement is transmitted to the second external apparatus, and after that, a first connection process in which the connection with the second external apparatus is terminated, and a second connection process in which transmission of another advertisement based on the predetermined protocol is started are carried out.

* * * * *